United States Patent [19]  
Hesske et al.

[11] Patent Number: 5,067,246  
[45] Date of Patent: Nov. 26, 1991

[54] GAUGE FOR MEASURING TREE-TRUNK GROWTH AND THE LIKE

[75] Inventors: Benno Hesske, Salzburg; Franz Adnrae, Wilhelmsburg; Peter Weber, Salzburg, all of Austria

[73] Assignee: Feinmechanische Optische Betriebsgesellschaft m.b.H., Salzburg, Austria

[21] Appl. No.: 663,101

[22] Filed: Mar. 1, 1991

[51] Int. Cl.⁵ ............................................. G01B 3/10
[52] U.S. Cl. ................................................. 33/555.4
[58] Field of Search ................ 33/700, 555.1, 555.4, 33/787, 790, 679.1, 784, 799

[56] References Cited
U.S. PATENT DOCUMENTS

| | | | |
|---|---|---|---|
| 1,385,139 | 7/1921 | MacDougal | 33/629.1 |
| 1,978,682 | 10/1934 | Marvin | 33/555.4 |
| 2,609,610 | 9/1952 | Elmes | 33/555.4 |

Primary Examiner—Harry N. Haroian  
Attorney, Agent, or Firm—Herbert Dubno; Andrew Wilford

[57] ABSTRACT

A gauge for measuring a change in the spacing between two locations has a support that is fixed at one of the locations and a wheel pivotal on the support about an upright axis and having an outer periphery. The wheel periphery and the support have juxtaposed portions one of which is provided with a pointer and the other of which is provided with a scale so that the pointer moves along the scale as the wheel pivots on the support. A flexible belt has an inner end anchored on the support, a middle portion, and an outer end attached at the other location. This outer end is releasably fixed to the wheel periphery and a spring urges the wheel rotationally on the support in a direction pulling the middle belt portion taut between the locations. Thus as the two locations move relative to each other the pointer moves relative to the scale.

14 Claims, 3 Drawing Sheets

GAUGE FOR MEASURING TREE-TRUNK GROWTH AND THE LIKE

FIELD OF THE INVENTION

The present invention relates to a gauge for measuring the growth of a tree trunk or another dimensional change, or the like. More particularly this invention concerns such a gauge which is used to ascertain the exact increase in girth of a tree trunk o the width of a split in a wall.

BACKGROUND O THE INVENTION

In forestry a critical statistic is the increase in girth of a tree trunk with time. This girth measurement must be taken periodically in order to determine the action of fertilizers, stand treatment, climate, and other factors. Since a tree grows fairly slowly, it is necessary that the measurement be done with considerable accuracy.

The simplest procedure is to take a flexible rule and wind it around a tree trunk at a given level above the ground, and then compare the measurement thus taken with the previous such measurement. Such a procedure is haphazard at best, since the trunk girth can vary somewhat in a range of a few inches of height. In addition it places on the person collecting the statistics the need to keep track of the previous measurement for that exact tree so as to be able to calculate the change in girth, which differential is the only real number of interest.

In another known system a flexible but inextensible tape measure is formed with a row of holes. It is wrapped around a tree trunk so that its end overlap, and a coil spring is hooked over the lapping ends between two holes of the tape to keep it snug on the tree. This tape is unlikely to move vertically much so that it will give a fairly accurate reading. Nonetheless it still leaves to the person taking the measurements the responsibility of keeping track of the previous measurement.

Similarly it is frequently necessary to determine the change in spacing between sides of a crack in wall or to determine if building parts are shifting relative to each other over time. Such a measurement is normally very difficult to make accurately.

OBJECTS OF THE INVENTION

It is therefore an object of the present invention to provide an improved gauge for measuring tree-trunk girth or the like.

Another object is the provision of such an improved gauge for measuring which overcomes the above-given disadvantages, that is which accurately and surely gives a readout of the growth since the last reading.

SUMMARY OF THE INVENTION

A gauge for measuring an increase in girth of an upright tree trunk according to this invention comprises a support that is fixed to the tree trunk and a wheel pivotal on the support about an upright axis and having an outer periphery. The wheel periphery and the support have juxtaposed portions one of which is provided with a pointer and the other of which is provided with a scale so that the pointer moves along the scale as the wheel pivots on the support. A flexible but inextensible belt has an inner end anchored on the support, a middle portion wrapped around the trunk level with the support, and an outer end lying against the periphery of the wheel. This outer end is fixed to the wheel periphery and a spring urges the wheel rotationally on the support in a direction pulling the middle belt portion tight around the trunk. Thus as the trunk grows the pointer moves relative to the scale.

This arrangement can also be used by securing the support to one object or location whose distance from another object or location is to be measured, and then securing the inner end of the flexible belt to the other object. Thus any increase or decrease in the distance between the two objects can be read out easily, so as to determine the spacing between locations that do not eve touch each other.

With this system, therefore, there is no chance of the belt moving so that the measurement will be extremely accurate. Furthermore it is possible to reclamp the outer belt end while setting the pointer to a new initial setting and thereafter determining change in dimension by comparing the two consecutive readings. This completely eliminates the need to keep track of the previous measurement for the particular tree.

In accordance with this invention the belt is a metal strap and the scale is on the wheel and the pointer which carries a vernier is on the support. Furthermore the outer end is fixed by a radially displaceable clamp element carried on the wheel and capable of pinching the outer belt end against the wheel periphery. The spring itself is a coil spring extending secantally of the wheel axis and having one end fixed on the support and an opposite end fixed o the wheel.

To accommodate trees of different sizes the belt includes an inner belt piece fixed permanently to the support and having an outer end formed as a hook and an outer belt piece having an inner end formed as an eye engaged over the hook. Thus the outer piece can be long for a tree up to 600 mm in girth and short for a small one. Furthermore to prevent the belt from slipping vertically along the trunk, especially during set up, at least one staple is engaged over the belt with the trunk and forms for the belt a guide on the trunk, permitting the belt to move longitudinally while preventing it from slipping vertically.

BRIEF DESCRIPTION O THE DRAWING

The above and other objects, features, and advantages will become more readily apparent from the following, reference being made to the accompanying drawing in which.

SPECIFIC DESCRIPTION

Figure 1A:
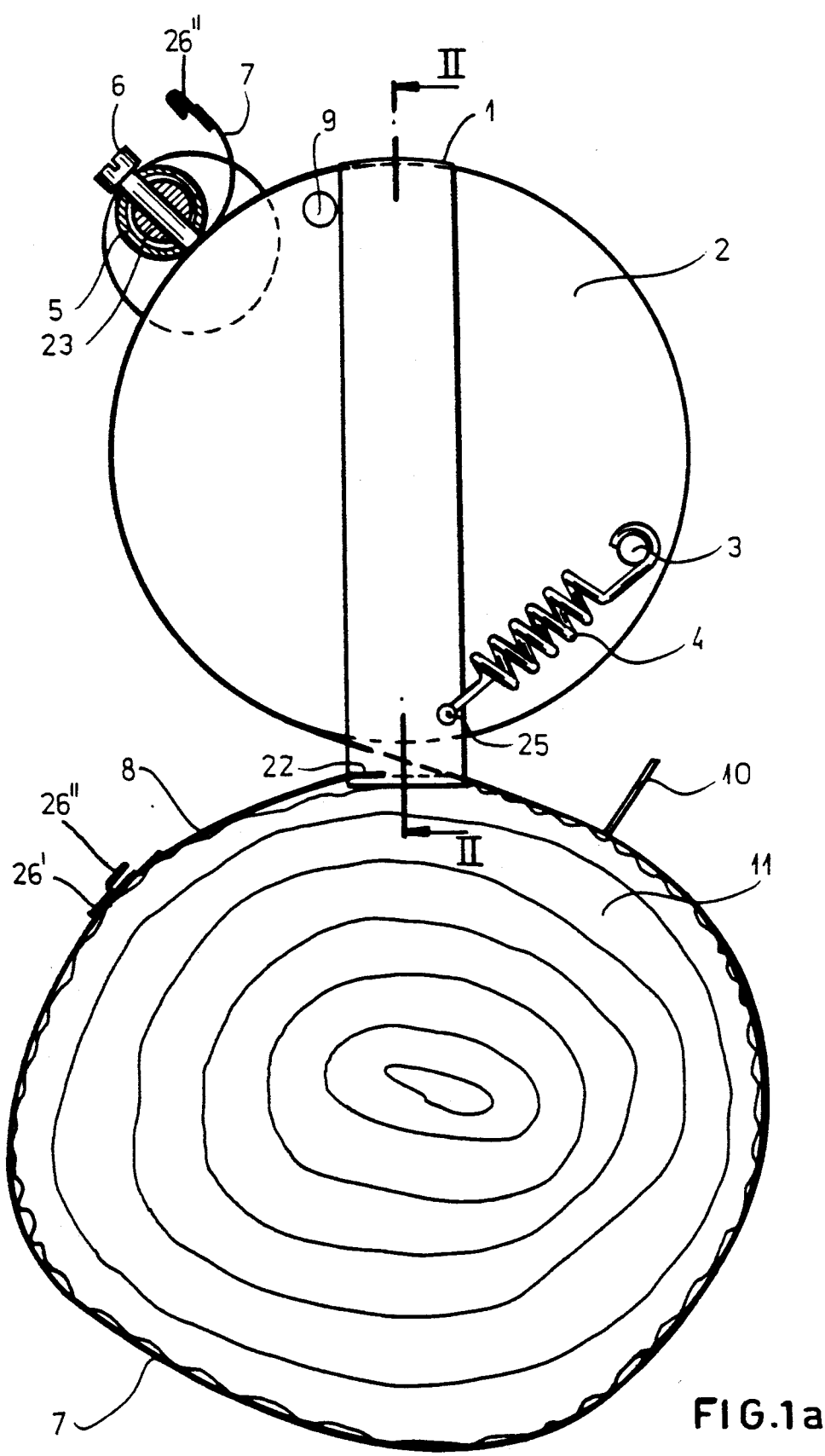
FIG. 1a is a bottom view partly in horizontal section illustrating the gauge of this invention when used for measuring trunk growth of a tree.
Figure 2:
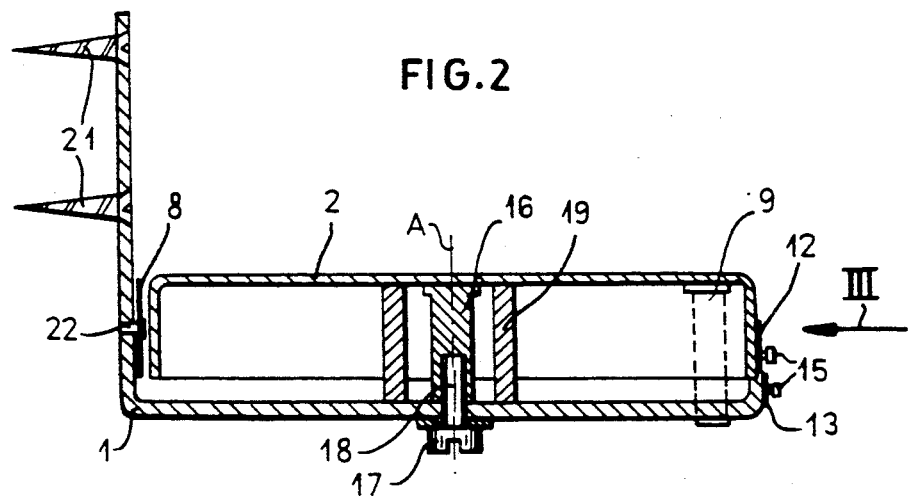
FIG. 2 is a vertical section taken along line II—II of FIG. 1 through the gauge.
Figure 3:
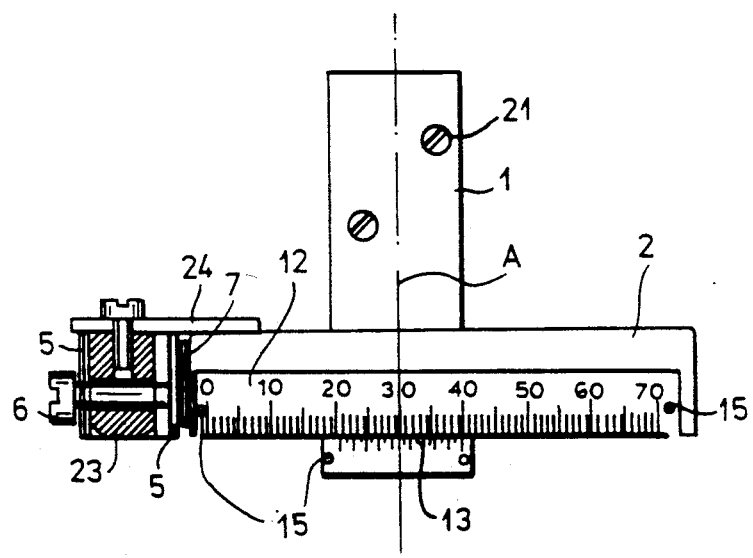
FIG. 3 is a partly sectional view taken in the direction of arrow III of FIG. 2.
Figure 4:
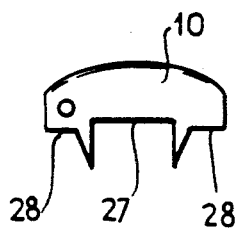
FIG. 4 is a side view of a belt-guide staple according to the invention.

As seen FIGS. 1a2, and 3 of the drawing the gauge according to this invention comprises a J-shaped support bracket 1 having a long upright leg that is normally secured by screws 21 to a tree trunk 11, a horizontal bight portion from which extends an upright pivot or axle 16 defining an axis A, and a short outer upright leg carrying a vernier 13 used as a pointer and fixed by rivets 15 to the support 1. A wheel 2 is pivoted at the axis A on the axle 16 and carries a scale 12 also fixed by small rivets 15 and juxtaposed with the vernier 13.

Figure 5:
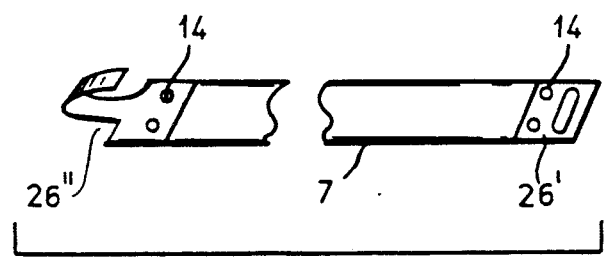
FIG. 5 is a perspective view of the belt assembly.

An inner belt 8 has one end fixed at 22 on the inner leg of the support 1 and is wound partly around the tree trunk 11. This belt 8 has an outer end that is provided as shown in FIG. 5 with a hook 26" engaged in an eye 26' of an outer belt 7 whose outer end has another such eye 26' and is pinched against the periphery of the wheel 2 by a clamp constituted by a cylindrical tube section 5 urged radially inward by a screw 6 anchored in a pin 23 secured via a plate 24 to the upper face of the disk 2. Thus the one end of the belt 7, 8 is fixed to the wheel 2 and the opposite end to the support 1. A pin 9 fixed on the wheel 2 can engage the support 1 to define one angular end position for it on the support 1.

Figure 1B:
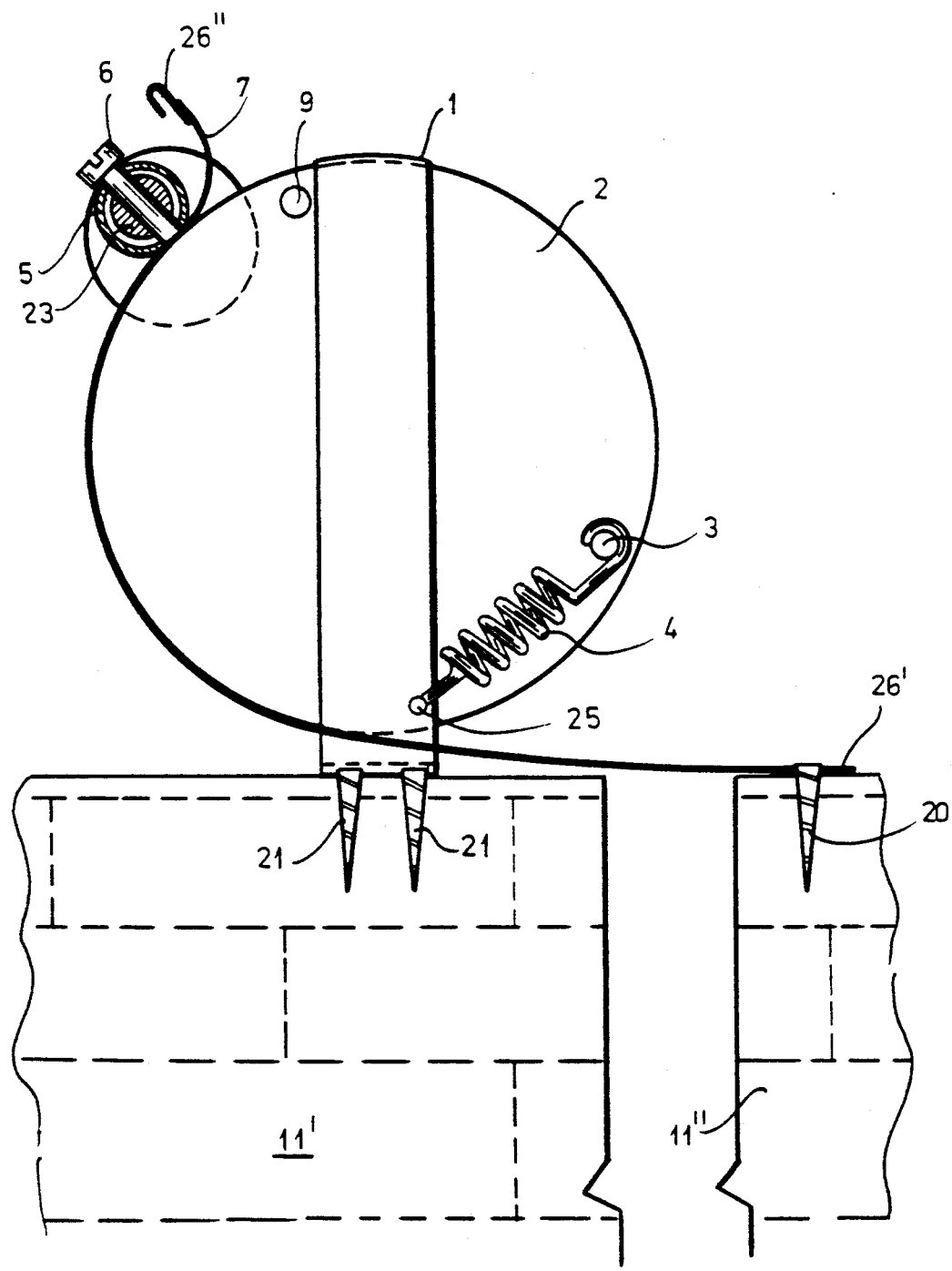
FIG. 1b is a bottom view partly in horizontal section illustrating the gauge of this invention when used to measure the horizontal spacing between two wall sections.

A spring 4 extending secantally of the axis A has an outer end hooked at 3 on the wheel 2 and an inner end hooked in a hole 25 formed in the support 1. Thus this spring 4 urges the wheel 2 rotationally clockwise as seen in FIG. 1 to pull the belt 7, 8 taut around the trunk 11.

To use the gauge according to this invention to measure tree-trunk growth the support bracket 1 is first screwed to the tree. Then the belt 7, 8 is wound around the trunk 11 and slipped under the clamp element 5. The vernier 13 is set to the starting point and the screw 6 is tightened to hold the assembly in place. Subsequent growth of the tree is therefore read directly off the scale 12. The scales can be accurate to 0.1 mm.

To prevent the belt 7, 8 from moving vertically on the trunk 11, staples 10 formed of sheet metal and having a central throat surface 27 that lies ahead of outer abutment surfaces 28 are driven into the trunk 11 astraddle the belt 7, 8. The forward surfaces 28 hold the surface 27 back so the staple 11 acts as a guide that impedes vertical slipping of the belt 7, 8 on the trunk 11 but in no way impedes its longitudinal movement.

For use in measuring the increase or decrease in width of a crack between two adjacent wall sections 11' and 11" the support 1 is screwed or otherwise secured to one of the wall sections 11' and the eye 26 of the belt 7, 8 is secured by a screw 20 or the like to the other wall section 11". The device is otherwise initially set to tension the belt 7, 8 as described above for the tree trunk and can therefore directly indicate any increase or decrease of the spacing between the two wall sections 11' and 11".

I claim:

1. A gauge for measuring a change in a dimension between one location and an adjacent location on at least one object, the gauge comprising:
   a support;
   means for fixing the support at one of the locations;
   a wheel pivotal on the support about an upright axis and having an outer periphery, the wheel periphery and the support having juxtaposed portions one of which is provided with a pointer and the other of which is provided with a scale, whereby the pointer moves along the scale as the wheel pivots on the support;
   a flexible belt having an inner end anchored at the other location, a middle portion, and an outer end lying against the periphery of the wheel;
   means for fixing the outer end to the wheel periphery; and
   spring means for urging the wheel rotationally on the support in a direction pulling the middle belt portion tight between the locations, whereby as the relative positions of the locations changes the pointer move relative to the scale.

2. The gauge defined in claim 1 wherein the belt is a metal strap.

3. The gauge defined in claim 1 wherein the scale is on the wheel and the pointer is on the support.

4. The gauge defined in claim 1 wherein the means for fixing the outer end is a radially displaceable clamp element carried on the wheel and capable of pinching the outer belt end against the wheel periphery.

5. The gauge defined in claim 1 wherein the spring means includes a coil spring extending secantally of the wheel axis and having one end fixed on the support and an opposite end fixed on the wheel.

6. The gauge defined in claim 1 wherein the belt includes an inner belt piece fixed permanently to the support and having an outer end formed as a hook and an outer belt piece having an inner end formed as an eye engaged over the hook.

7. The gauge defined in claim 1 further comprising at least one staple engaged over the belt with the trunk and forming for the belt a guide on the trunk.

8. A gauge for measuring an increase in girth of an upright tree trunk, the gauge comprising:
   a support;
   means for fixing the support to the tree trunk;
   a wheel pivotal on the support about an upright axis and having an outer periphery, the wheel periphery and the support having juxtaposed portions one of which is provided with a pointer and the other of which is provided with a scale, whereby the pointer moves along the scale as the wheel pivots on the support;
   a flexible belt having an inner end anchored on the support, a middle portion wrapped around the trunk level with the support, and an outer end lying against the periphery of the wheel:
   means for fixing the outer end to the wheel periphery; and
   spring means for urging the wheel rotationally on the support in a direction pulling the middle belt portion tight around the trunk, whereby as the trunk grows the pointer moves relative to the scale.

9. The gauge defined in claim 8 wherein the belt is a metal strap.

10. The gauge defined in claim 8 wherein the scale is on the wheel and the pointer is on the support.

11. The gauge defined in claim 8 wherein the means for fixing the outer end is a radially displaceable clamp element carried on the wheel and capable of pinching the outer belt end against the wheel periphery.

12. The gauge defined in claim 8 wherein the spring means includes a coil spring extending secantally of the wheel axis and having one end fixed on the support and an opposite end fixed on the wheel.

13. The gauge defined in claim 8 wherein the belt includes an inner belt piece fixed permanently to the support and having an outer end formed as a hook and an outer belt piece having an inner end formed as an eye engaged over the hook.

14. The gauge defined in claim 8 further comprising at least one staple engaged over the belt with the trunk and forming for the belt a guide on the trunk.

* * * * *